June 20, 1933.  F. H. GOODELL ET AL  1,914,852
MATERIAL TREATING AND HANDLING APPARATUS
Filed March 23, 1932   6 Sheets-Sheet 1

INVENTOR.
Frank H. Goodell
Dewey C. Harvey
BY
Fay Oberlin & Fay
ATTORNEYS

June 20, 1933. F. H. GOODELL ET AL 1,914,852
MATERIAL TREATING AND HANDLING APPARATUS
Filed March 23, 1932 6 Sheets-Sheet 4

INVENTOR.
Frank H. Goodell
BY Dewey C. Harvey
Fay Oberlin & Fay
ATTORNEYS.

June 20, 1933.   F. H. GOODELL ET AL   1,914,852
MATERIAL TREATING AND HANDLING APPARATUS
Filed March 23, 1932   6 Sheets-Sheet 5

INVENTOR.
Frank H. Goodell
BY Dewey C. Harvey
Fay Oberlin & Fay
ATTORNEYS.

Patented June 20, 1933

1,914,852

UNITED STATES PATENT OFFICE

FRANK H. GOODELL AND DEWEY C. HARVEY, OF CLEVELAND, OHIO, ASSIGNORS TO THE C. O. BARTLETT & SNOW COMPANY, OF CLEVELAND, OHIO, A CORPORATION OF OHIO

MATERIAL TREATING AND HANDLING APPARATUS

Application filed March 23, 1932. Serial No. 600,666.

This invention relates in general to material treating and handling apparatus, and more particularly to apparatus for the continuous pickling of plates, sheets, pipe, automotive stock parts, such as wheel rim stock pieces, and various other articles, but which may be employed for other metal treating operations, such as galvanizing and rustproofing.

In accordance with the invention, article supporting members or carriers are loaded at a loading station with articles which are to be treated, and the carriers are then moved along a track positioned over tanks containing materials for treating the articles, whereby the articles are caused to traverse the tanks and be suitably treated therein. The carriers are then moved to an unloading station, where the treated articles are discharged from the carriers onto a suitable conveyor and removed from the path of movement of the oncoming carriers. From the unloading station, the empty carriers are transferred to another track, positioned either above or below the first track and are moved along this track to the loading station to be reloaded.

The primary object of the invention is to effect the various movements of the carriers by means of mechanism driven or operated by a single driving agent, such as an electric motor, whereby the movements may be synchronized and the carriers loaded and unloaded at properly timed intervals.

Another object of the invention is to provide novel means for loading the carriers with sheets, plates, or other articles to be treated.

Still another object of the invention is to provide novel means for effecting the discharge of the pickled sheets, plates, or other articles from the carriers.

A further object of the invention is to provide a novel construction of carrier for plates or sheets, having readily replaceable hook-like hangers. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
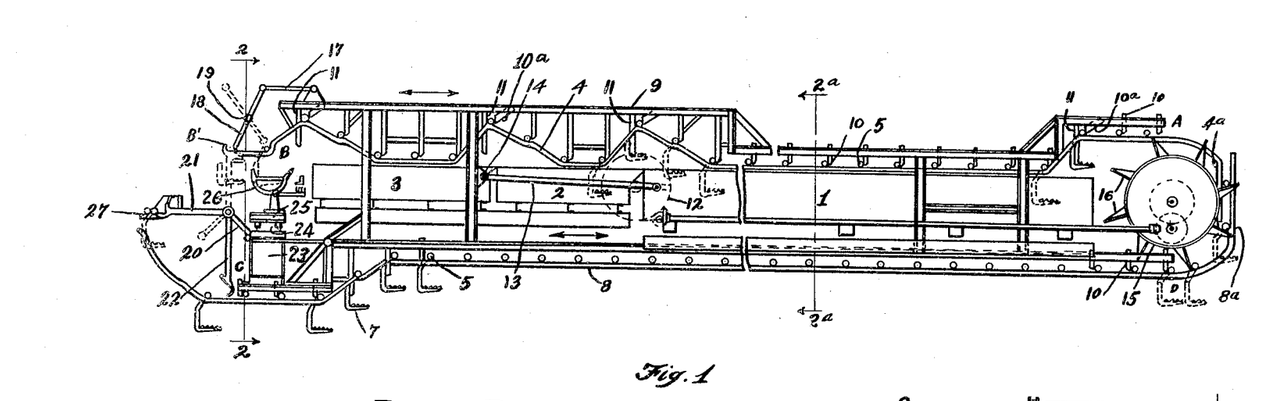
Fig. 1 is a side elevation, showing more or less diagrammatically one form of apparatus which is particularly adapted for the continuous pickling of stock pieces for automobile wheel rims.
Figures 1A, 1B, 2:
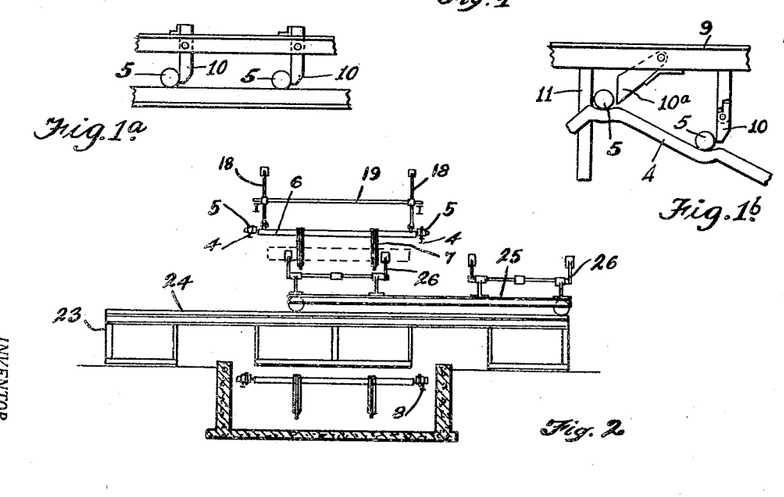
Figs. 1a and 1b are detail views showing the manner in which the dogs 10 and 10a are pivotally secured to the frame and the arms 11 rigidly secured to the frame.
Fig. 2 is a cross-sectional view, taken on the line 2—2 of Fig. 1, and showing the mechanism for removing the treated pieces out of the path of movement of the oncoming carriers.
Figure 2A:
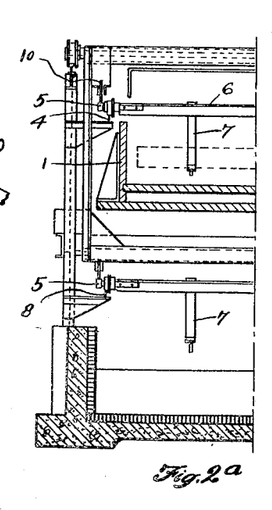
Fig. 2a is a cross-sectional view, taken on the line 2a—2a of Fig. 1.

The apparatus, as shown in Figs. 1, 2 and 2a, and which is particularly adapted for the pickling of stock pieces for automobile wheel rims, includes a pickling tank 1, a rinsing tank 2 and a soda tank 3, these tanks being in end to end arrangement so as to successively receive the pieces to be treated.

Mounted on a suitable stationary frame are spaced rails 4 constituting a track along which rollers 5 journalled in the ends of cross-arms 6 of carriers 7 are adapted to be moved during the passage of the articles to be treated through the tanks 1, 2 and 3. The stationary frame also supports spaced rails 8 constituting a track upon which the empty carriers are returned to the loading station. The rails 4 have at one end, downwardly bent portions 4a, which with upwardly bent portions 8a of rails 8, constitute a guideway up which the carriers are adapted to be moved during the loading thereof.

A reciprocating frame 9, mounted for movement on suitable tracks on the stationary frame has secured thereto at spaced intervals pivoted dogs 10 and 10a, which serve to progressively push the carriers along the tracks on which they are supported. In addition to the pivoted dogs 10, the frame 9 has rigidly secured thereto at certain points arms 11, which serve a purpose to be presently described.

Reciprocating movement is imparted to the frame 9 by means of suitable mechanism, including a driven eccentric 12 and a connecting arm 13, which is pivotally secured to the frame, as at 14. The eccentric 12 is also caused to impart continuous rotary movement to a wheel 15 by means of suitable gearing, as shown. The wheel 15 has a number of peripherally spaced teeth or paddles 16. Reciprocating movement of the frame 9 also causes a link 17 to oscillate levers 18, which are pivoted on a shaft 19 mounted in the stationary frame, to thereby cause it to assume two positions, one of which is shown in solid lines and the other in dotted lines. Movement of the frame 9 also causes a link 20 to oscillate a shaft to which are rigidly secured arms 21 and 22, the oscillation causing the arm 21 to assume two positions, one shown in solid lines and the other in dotted lines, and the arm 22 to assume two positions, one shown in solid lines and the other the position occupied by the solid line position of arm 21.

Mounted on suitable framework 23 are tracks 24 upon which a truck 25 is adapted to move in a direction transverse to the direction of movement of the frame 9. The truck supports two cradles 26, and in the movement of the truck from one end of the tracks to the other, each cradle is in turn brought into the path of one of the carriers to receive the treated articles therefrom.

The operation of the apparatus which has just been described is briefly as follows:

The teeth 16 of the wheel 15 move the carriers vertically upward in the guideway formed by the portions 4a and 8a of the rails 4 and 8 respectively, and during this movement, the carriers are loaded with the articles or pieces to be treated. The loaded carriers are then moved to a position indicated at A, from which they are moved along on the rails 4 by means of the pivoted dogs 10 and 10a which in their return movement pivot to clear the cross arms 6. In this way, the articles to be treated are successively moved into and out of the pickling tank, into and out of the rinsing tank and into and out of the soda tank. Movement of the carriers down the inclined portions of the rails 4 is eased by means of the arms 11, in a manner which will be readily understood. At the point B, the carriers drop a short distance and in so doing deposit the treated pieces on one of the cradles 26. The empty carrier is then kicked over to the position B' by the lever 18, where it is received by the hook-like end of the arm 21.

As soon as the carrier which has just been unloaded is out of the path of movement of the cradle, the cradle is moved to the end of the track 24, and is tipped by suitable mechanism to dump its contents, the other cradle, in the meantime, moving to a position to receive the contents of the next carrier.

In the next movement of the reciprocating frame, the arm 21 is moved to its solid line position and deposits the empty carrier on a stationary element 27 which has a sloping surface which causes the carrier to move clear of the arm 21, so as not to impede the return movement of the arm 21 to its dotted line position. In the next movement of the reciprocating frame, the arm 22 moves up to its upper position, lifts the carrier off the element 27, and then moves downward, easing the carrier against the rails 8. When the empty carrier reaches the point C, it is again moved along by the pivoted dogs on the reciprocating frame to a point D, from which it is moved to the loading station by means of the paddles 16 on wheel 15.

Figure 3:
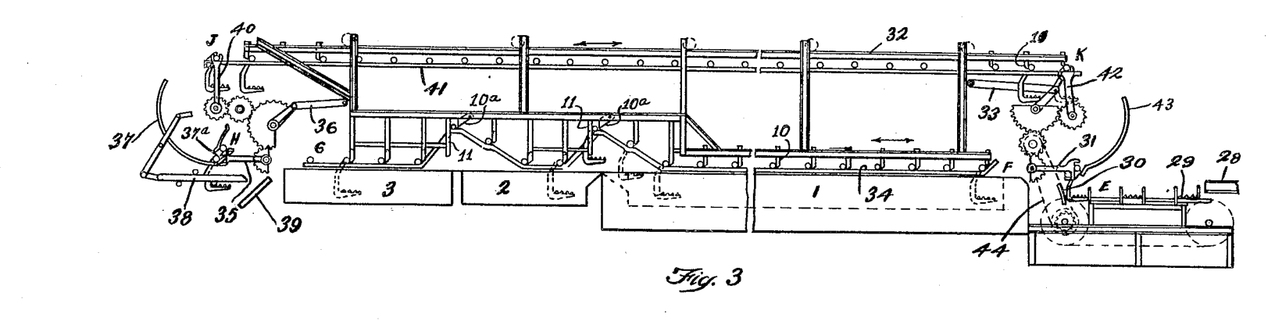
Fig. 3 is a side elevation, showing a modification of the apparatus shown in Figs. 1 and 2.
Figures 3A, 10A, 19:
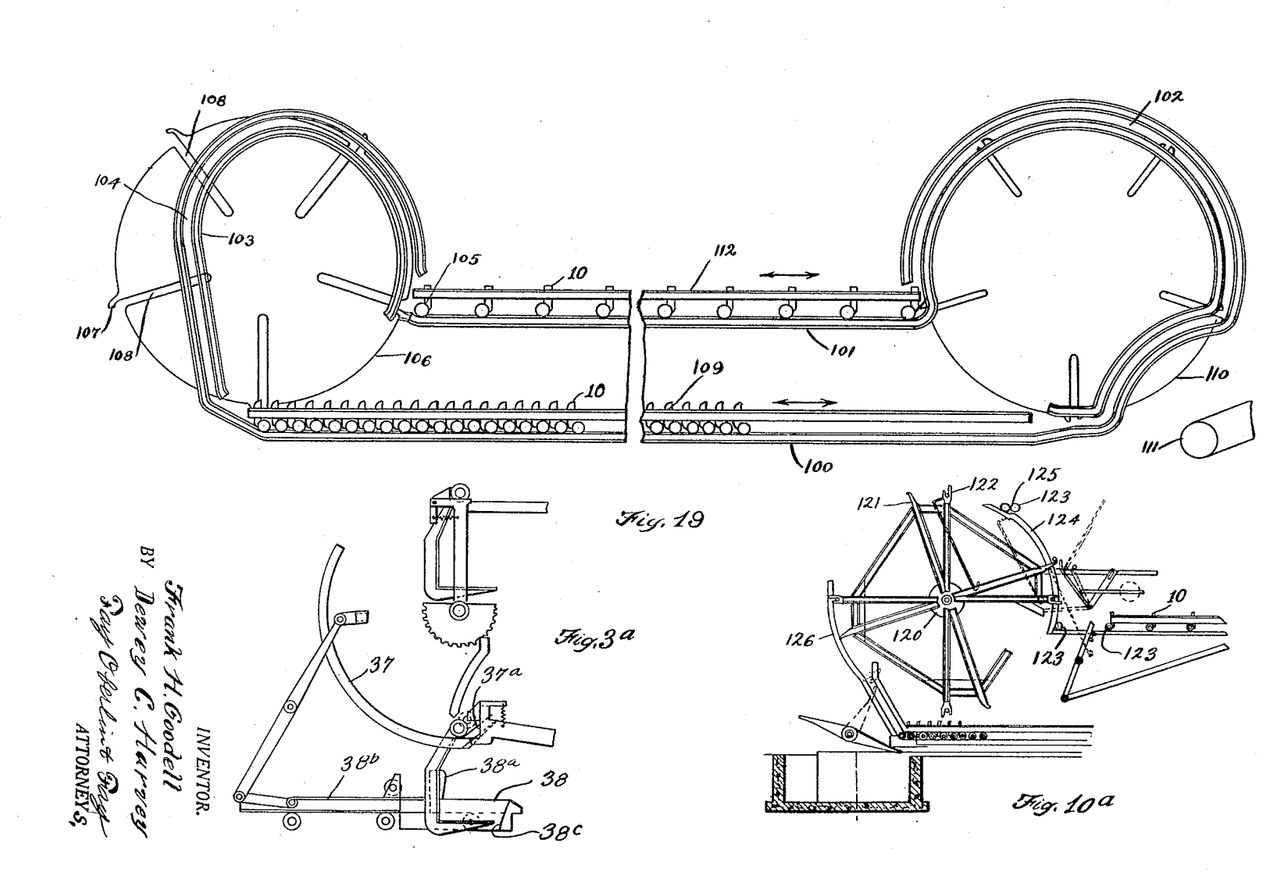
Fig. 3a is an enlarged detail of a portion of the apparatus shown in Fig. 3.
Fig. 10a shows a modification of the sheet loading mechanism shown in Fig. 4.
Fig. 19 shows another modified form of apparatus which may be used for the continuous pickling of plates and sheets.

In that form of the apparatus, shown in Figs. 3 and 3a, the pieces to be pickled are removed from a loading platform 28, and deposited on an endless conveyor 29, on which they are carried to point E. Here they are picked up by one of the carriers 30 which is supported by an arm 31. Movement of the reciprocating frame 32 to the left causes a link 33, which is pivoted to the frame, to actuate suitable gearing and rotate the arm about 180° in a counter-clockwise direction. This movement brings the carrier 30 to the point F, where it is released by the arm 31 and deposited on the rails 34. From this point, the carriers are moved along on the rails 34 by means of the pivoted dogs secured to the reciprocating frame 32 to a point G. During this movement, the carriers supporting the pieces to be treated traverse the tanks 1, 2 and 3, as previously described in connection with the apparatus shown in Fig. 1. At the point G, the carrier is lifted out of the tank 3 by an arm 35, which, by means of suitable gearing actuated by the link 36, secured to the reciprocating frame, is caused to rotate about 180° in a counter-clockwise direction. This movement brings the carrier to a point H, where it slides down an inclined portion 37a of arcuate guide 37. In this movement, the treated articles strike a stop 38a of a stationary support 38, and the carrier continues to move down into a suitable opening in the support, thereby leaving the articles on the support. Upon the next reciprocation of the frame 32, an arm 38b which is actuated by a series of links connected to the frame, moves to the right and pushes the articles from the support 38 onto an inclined guide 39 from which they are removed to any desired point. An abutment 38c, which forms a part of the support 38 prevents the carrier from being tilted during the movement of the arm 38b. An arm 40 which is also actuated by the link 36, rotates about 180° in a clockwise direction, and moves the empty carrier along the guide 37 and up to the point J, where the carrier is deposited on the rails 41. From this point, the empty carrier is moved by the pivoted dogs on the reciprocating frame to the other end of the rails, to a point K. At this point, the empty carrier is moved by an arm 42, about 180° in a clockwise direction, and down the arcuate guide 43 to its initial loading position. The arm 42 is actuated by the link 33 by means of suitable gearing as shown. The conveyor 29 is driven by the movement of the reciprocating frame, as by means of a chain belt 44, and ratchet so that proper synchronism between the movement of the carriers and the articles to be loaded thereon for treatment is secured.

In Figs. 4 to 10 is shown a form of apparatus, which is particularly adapted to be used for the continuous pickling of sheets and plates.

Figure 4:
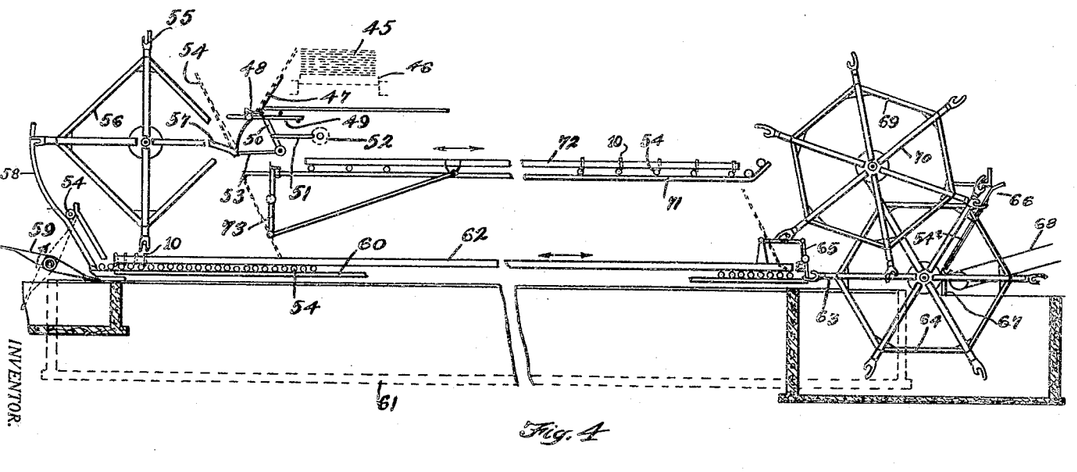
Fig. 4 is a side elevation of another modified form of the apparatus designed for the continuous pickling of sheets and plates.

The plates 45, to be pickled, are removed, one at a time, from a platform 46, and placed on a stationary arm 47, the lower edge of the plate resting on a swinging arm 48, which is held in a horizontal position by a retractable arm 49. The arm 49 has a pin and slot connection with an arm 50, which is in turn pivoted to a connecting arm 51, operated by an eccentric 52. The connecting arm 51 is also adapted to swing an arm 53 from the position shown to a position in which its end lies directly under the swinging arm 48.

When the arm 49 is retracted by the eccentric 52, the arm 53 rises, and when it reaches its upper position, the swinging arm 48 drops and allows the plate to rest on the arm 53. The arm 53 is then lowered, carrying with it the plate, which is then caught by the lower hooked ends of carriers 54, which are supported on a cross-arm resting in one of the hooked arms 55 of a rotatable spider wheel 56. In the meantime the arm 49 has again moved forward, raising the arm 48 to receive the next plate, and pushing the plate which is resting on the hooked end of a carrier 54 against said carrier. A stationary hook guide 57 keeps the carriers in an inclined position while the plate is being placed thereon.

The wheel 56 rotates in a counter-clockwise direction, bringing the carrier 54 to the guide 58, down which it is eased until it reaches one of the paddles of a revolving arm 59. The arm 59 deposits the carrier on the rails 60, and the carrier is then moved along through the pickling tank 61 by means of pivoted dogs mounted in the reciprocating frame 62. When the last carrier reaches the end of the rails 60, it is kicked over to the notched arm 63 of a spider wheel 64, by means of a mechanism 65. The wheel 64 continuously rotates in a clockwise direction until the arm supporting the carrier reaches a stationary support 66, the carrier being pushed by the arm to a point where it may rest on the support without impeding further movement of the arm. During this movement, the lower hooked ends of the carriers strike a crossbar 67, thereby causing the carriers to tilt forwardly and discharge the plate on a belt conveyor 68, which removes the finished plates. During the time the carrier is supported by the wheel 64, the plate may be washed by sprinkling.

A spider wheel 69 having notched arms 70, moves in a counter-clockwise direction, and in so moving, one of the arms 70 lifts the empty carrier from the support 66 and carries it around to rails 71, on which the carrier is deposited. The pivoted dogs on a reciprocating frame 72 push the carriers to the other end of the rails, and each carrier is in turn pushed by an oscillating arm 73 to a position in which it may be picked up by one of the arms 55 of the spider wheel 56, and carried to its initial loading position.

In order to save expense, the pivoted dogs used to return the empty carrier to the loading position are spaced farther apart than the ones used to move the carriers through the pickling tank. This permits the use of fewer acid resisting carriers. The reciprocating movements of the frames 62 and 72 are so timed that the empty carriers move about four times as far as the loaded carriers during each forward movement of the carriers.

The entire apparatus is adapted to be driven from one motor and reducer so that the various operations will be properly synchronized.

Figure 5:
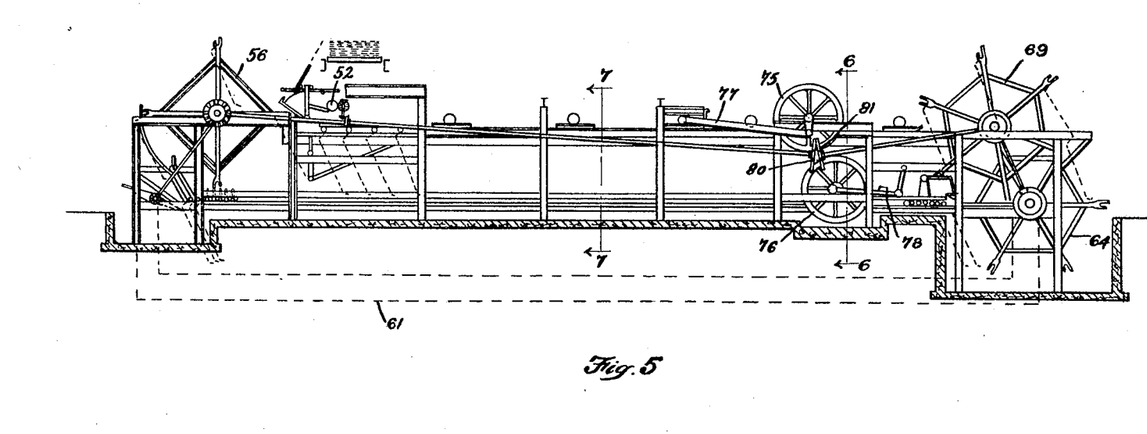
Figs. 5 to 10 inclusive show details of the mechanism employed for synchronously driving the various parts of the apparatus shown in Fig. 4.
Figure 6:
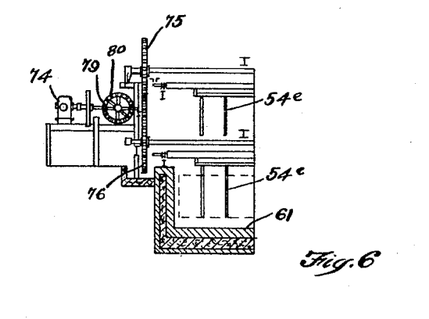
Figure 7:
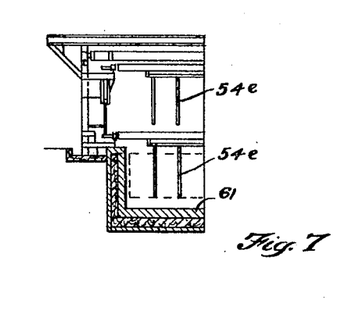

Figs. 5, 6 and 7 show details of the driving mechanism for the apparatus shown in Fig. 4. A motor driven reducer 74, through a suitable pinion, drives eccentrics 75 and 76, which, through connecting arms 77 and 78, cause reciprocating movement of the frames 72 and 62 respectively, the throw of the eccentrics being such as to move the frame 72 about four times as far as the frame 62 during each forward movement of the frames.

The reducer 74 also drives a pinion 79, which causes simultaneous rotation of bevel gears 80 and 81. By means of suitable connecting rods and bevel gears, the gears 80 and 81 cause rotation of the various spider wheels and revolving arms which have been described as well as the loading mechanism, as will be readily understood from Figs. 5 and 8 of the drawings.

Figure 8:
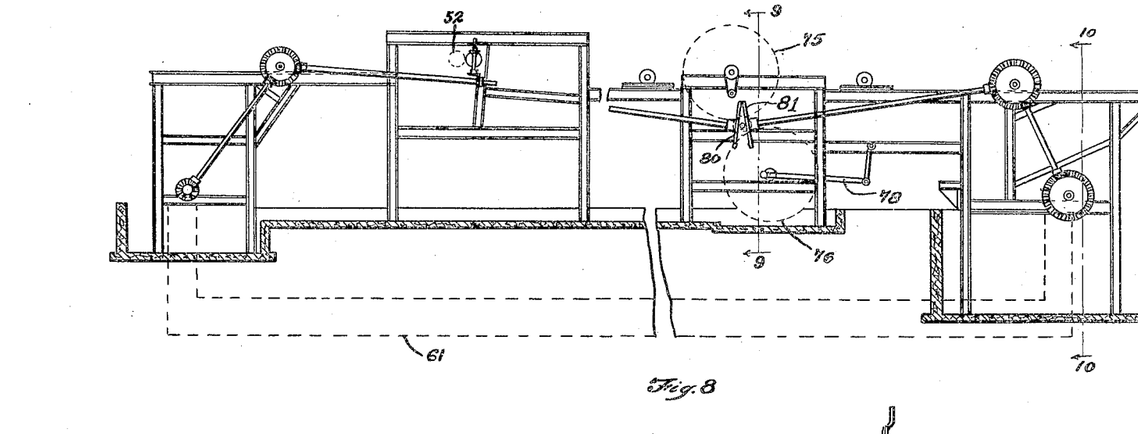
Figure 9:
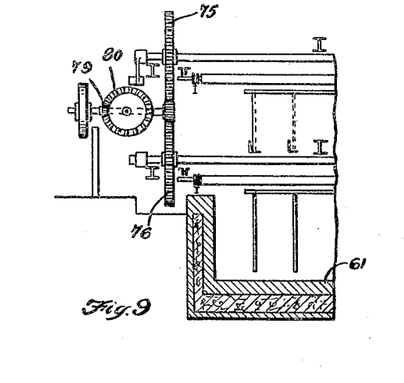
Figure 10:
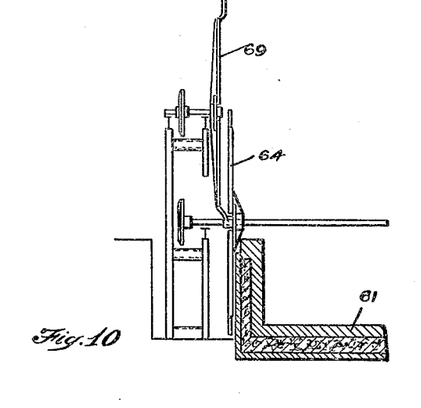

In Figs. 8, 9 and 10, parts of the apparatus have been omitted to more clearly show details of the driving mechanism.

In Fig. 10a is shown a modification of the sheet or plate loading mechanism of Fig. 4, in which a spider wheel 120 is provided with two sets of hooked arms 121 and 122, the hook-like ends of the arms 121 being at a greater radial distance from the axis of the U-shaped recesses in the wheel than the ends of the arms 122. As the wheel rotates in a counter-clockwise direction, the arms 121 in succession pick up the carriers 123 and move them up along an arcuate guide 124 to a shoulder or jog 125 on the guide, where the carrier drops back a short distance and remains stationary while being loaded. The arm 121, after depositing the carrier on this shoulder or jog continues in its movement, and after the carrier is loaded, the arm 122, which is immediately behind the arm 121 picks up the loaded carrier from the shoulder or jog, and carries it around to the arcuate guide 126. In all other respects, the operation of this loading mechanism is similar to that shown in Fig. 4.

In Figs. 11 to 14 are shown details of a preferred type of carrier which may be used in connection with the apparatus shown in Figs. 4 to 10.

Figures 11, 12, 13, 14, 15, 16, 17, 18:
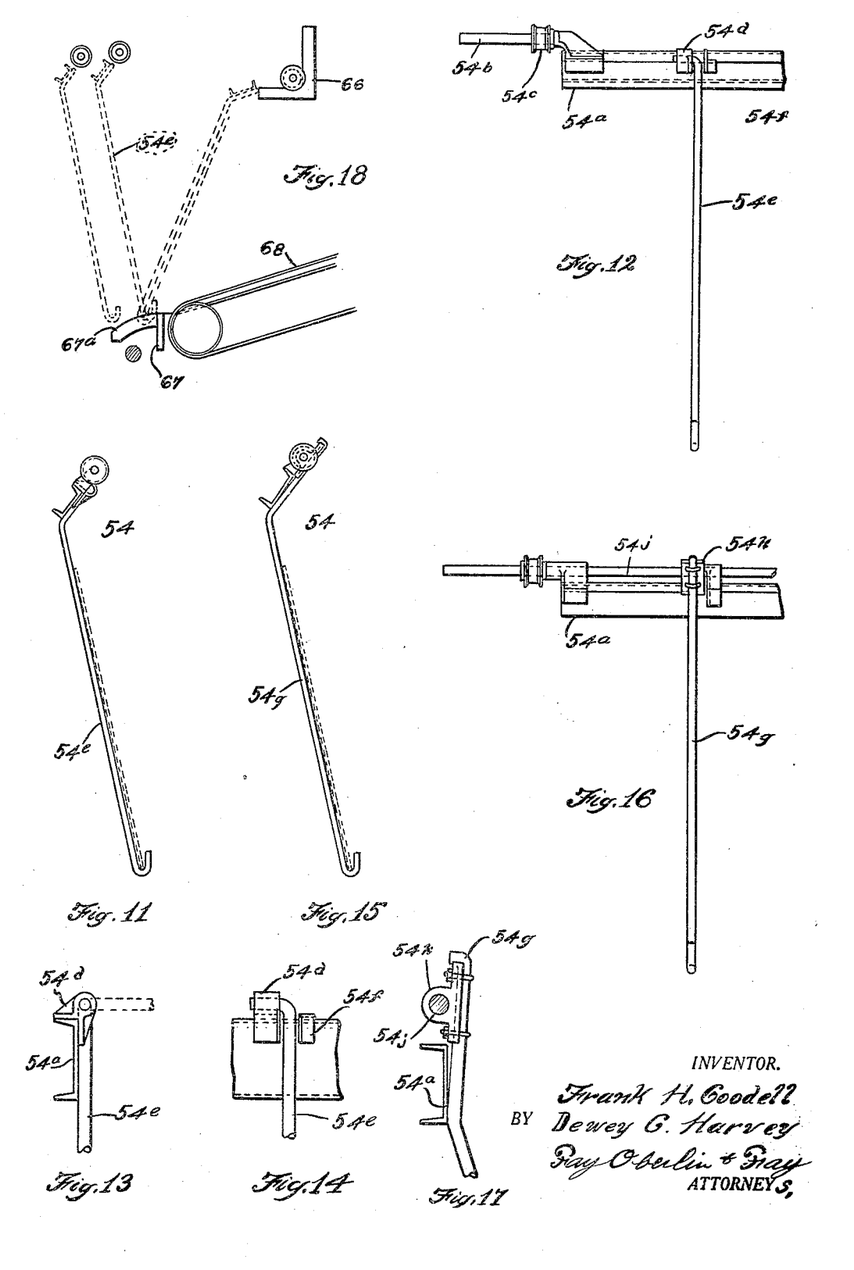
Figs. 11 to 14 inclusive show details of a preferred type of carrier which may be used in connection with the apparatus shown in Figs. 4 to 10.
Figs. 15 to 17 inclusive show details of a modified form of carrier which may be used in connection with the apparatus shown in Figs. 4 to 10.
Fig. 18 shows the manner in which the pickled plates are discharged from the carriers in that form of the apparatus shown in Fig. 4.

The carrier which is generally designated 54, includes a channel cross-arm 54a to the ends of which are rigidly secured shaft extensions 54b, on which are journalled rollers 54c. These rollers are adapted for movement along the tracks 60 and 71 of the apparatus. Secured to the cross-arm 54a at suitably spaced points are brackets 54d, constituting bearings for the support of plate carriers 54e having hook-shaped lower ends. These plate carriers are preferably made of an acid-resisting metal or alloy. The carriers when loaded, normally hang in the position shown in Fig. 11, and in this position, they are prevented from moving out of the brackets 54d by means of angle retaining plates 54f, which are rigidly secured to the cross-arm 54a. As shown in Figs. 13 and 14, the plate carriers 54e may be removed by swinging them to a horizontal position, clear of the retaining plates 54f and sliding them sideways out of the bracket 54d.

In Figs. 15 to 17, plate carrying hooks 54g are removably secured by means of U-bolts and nuts to bearings 54h, which are mounted for pivotal movement on a shaft 54j. In this case, the shaft 54j is rigidly secured in spaced relation to the cross-arm 54a. When loaded, the carrier assumes the position shown in Fig. 15.

The manner in which the plates are discharged from the carriers is clearly shown in Fig. 18. During the movement of the carriers to the support 66, the lower ends of the plate-carrying hooks 54e strike a cross-bar 67 to which are secured spaced angle guides 67a. The movement of the carriers causes the hooks to move down below the upper edges of the guides 67a, thereby causing the plate which is supported by the hooks to be lifted up clear of the hooks. The plate then drops by gravity on the conveyor belts 68.

In that form of the invention shown in Fig. 19, lower rails 100 are curved at their ends to form with curved portions of the upper rails 101 a guideway 102 at one end of the apparatus, while at the other end of the apparatus, curved portions of the rails 100 form with curved rails 103 a guideway 104. A wheel 106 having hook-shaped members 107 and slots 108 at spaced points in its periphery, rotates in a counter-clockwise direction, and each member 107 in succession lifts one of the carriers 105 up into the guideway 104, where it may be loaded in any suitable manner. The loaded carriers are moved around the guideway 104 to the other end of the guideway, where the carriers are deposited on the rails 100. It will be noted that various points in the guideway 104 are at different radial distances from the axis of the wheel 106, and for this reason, the slots 108 are provided to accommodate the movement of the carriers in the guideway.

The carriers are then moved through a suitable pickling tank by means of pivoted dogs on a reciprocating frame 109 to the other end of the track 100. At this point the hook-like members on a wheel 110 move the carriers upward out of the pickling tank. The lower ends of the carriers strike an abutment, causing the carriers to tilt forwardly and deposit the pickled plates on a conveyor 111, which removes them to another point. The empty carriers are carried by the wheel 110 through the guideway 102 around to the track 101, on which they are then moved to the loading position by pivoted dogs on a reciprocating frame 112. Here again, the empty carriers are moved about four times as far as the loaded carriers, with each forward movement of the frames 112 and 109.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:—

1. In a material treating and handling apparatus, a material treatment tank, means for supporting the material during passage thereof through the tank, a reciprocating frame having pivoted dogs secured thereto which in one direction of movement of the frame move the material supporting means and in the other direction of movement of the frame pivot to clear the material supporting means.

2. In material treating and handling apparatus, spaced sets of rails, material supporting carriers adapted to be moved along said rails, means for intermittently moving said material supporting carriers along said rails, and means actuated by said carrier moving means to transfer the carriers from one set of rails to the other.

3. In material treating and handling apparatus, spaced sets of rails, material supporting carriers adapted to be moved along said rails, means for intermittently moving said material supporting carriers along said rails, the carriers on one set of rails being spaced at greater intervals than the carriers on the other set of rails.

4. In material treating and handling apparatus, material carriers, spaced sets of rails for movably supporting said carriers, means for intermittently moving said material carriers along said rails, means for transferring the carriers from one set of rails to the other, and means for synchronizing the movement of the carrier moving means with the movement of the carrier transferring means.

5. In material treating and handling apparatus, material carriers, spaced sets of rails for movably supporting said carriers, means for moving said material carriers along said rails, means for transferring said carriers from one set of rails to the other, and means for automatically loading said carriers while on said transferring means.

6. In material treating and handling apparatus, material carriers, spaced sets of rails for movably supporting said carriers, means for moving said material carriers along said rails, means for transferring said carriers from one set of rails to the other, means for synchronizing the movement of the carrier moving means with the movement of the carrier transferring means, and means for automatically loading said carriers while on said transferring means.

7. In material treating and handling apparatus, material carriers, spaced sets of rails for movably supporting said carriers, means for moving said material carriers along said rails, means for transferring said carriers from one set of rails to the other, means for loading said carriers during their transfer from one set of rails to the other, and means for stationarily supporting said carriers during the loading thereof.

8. In material treating and handling apparatus, material carriers, spaced sets of rails for movably supporting said carriers, means for moving said material carriers along said rails, means for transferring said carriers from one set of rails to the other, said means comprising slotted wheels having hooked arms.

9. In material treating and handling apparatus, spaced sets of rails, material supporting carriers adapted to be moved along said rails, means for intermittently moving said material supporting carriers and means for transferring the carriers from one set of rails to the other.

Signed by us this 21 day of March, 1932.

FRANK H. GOODELL.
DEWEY C. HARVEY.